UNITED STATES PATENT OFFICE.

HUGO FRIEDMANN, OF CHARLOTTENBURG, GERMANY.

COMPOSITION OF MATTER.

No. 824,475.  Specification of Letters Patent.  Patented June 26, 1906.

Application filed November 15, 1905. Serial No. 287,520.

*To all whom it may concern:*

Be it known that I, HUGO FRIEDMANN, director of the Charlottenburger Farbwerke, Aktiengesellschaft, a subject of the German Emperor, and a resident of Charlottenburg, near Berlin, Charlottenburger-Ufer 53/54, Germany, have invented a certain new and useful Composition of Matter to be Used as an Addition to Printing Inks or Compounds; and I do hereby declare the following to be a full, clear, and exact description of the invention, such as will enable others skilled in the art to which it appertains to make and use the same.

My invention relates to a new and useful composition of matter to be used as an addition to printing inks or compounds, which may afterward be converted, as by grinding and mixing, into such inks, the object of same being the production of a varnish, paste, or addition adapted to be mixed with the usual ready-made typographic printing-inks or to the materials of which they are to be composed, so as to enable such ordinary ink to be used in lithographic printing without repeated moistening and wiping.

It is true that inks for flat printing have already been made that can be used without repeatedly damping and wiping the printing-plate and, further, that an intermediate product containing a paste-like varnish and glycerin has been formed in the process of making these inks. Pastes so obtained, however, are not suitable without further treatment imparting keeping properties, nor have they the property of being miscible with ordinary printing-ink at any time. A paste combining these properties, however, is of value, for the reason that large printers prefer to buy dry colors, which they grind along with suitable linseed-oil varnish in their own mills to make ink. By experiment a comparatively simple composition has been discovered for such a paste, fulfilling both conditions and capable of being added without trouble to the ink itself or to the ground mixture of dry color and varnish aforesaid. Such a paste may be composed of one hundred to one hundred and sixty parts of resin, particularly gum-dammar; twenty-five to eighty parts of mineral oil, preferably petroleum; two hundred and ninety to four hundred and thirty parts of glycerin; one hundred and twenty to two hundred and sixty parts of varnish, particularly linseed-oil varnish. In preparing the composition the resin or other gum is dissolved in the mineral oil. The varnish is then added. To the mixture glycerin is added in small quantities while the mixture is continuously stirred. The glycerin can also be added to the solution of the gum in mineral oil in small quantities and the varnish then added thereto. The inks prepared with this paste are also suitable for printing on rotary machines.

What I claim is—

1. The herein-described composition of matter to be used as an addition to printing-inks, or compounds which may afterward be converted, as by grinding and mixing, into such inks, consisting of resin, mineral oil, glycerin, and varnish.

2. The herein-described composition of matter to be used as an addition to printing-inks, or compounds which may afterward be converted, as by grinding and mixing, into such inks, consisting of about one hundred to one hundred and sixty parts of a resin, such as gum-dammar, twenty-five to eighty parts of a mineral oil, such as petroleum, two hundred and ninety to four hundred and thirty parts of glycerin, and one hundred and twenty to two hundred and sixty parts of a varnish, such as linseed-oil varnish.

In testimony that I claim the foregoing as my invention I have signed my name in presence of two subscribing witnesses.

HUGO FRIEDMANN.

Witnesses:
 HENRY HASPER,
 WOLDEMAR HAUPT.